United States Patent — [15] 3,693,161
Price et al. — [45] Sept. 19, 1972

[54] APPARATUS FOR INTERROGATING THE AVAILABILITY OF A COMMUNICATION PATH TO A PERIPHERAL DEVICE

[72] Inventors: William Chandler Price, Pasadena; Erwin A. Hauck; Jacob F. Vigil, both of Arcadia, all of Calif.

[73] Assignee: Burroughs Corporation, Detroit, Mich.

[22] Filed: July 9, 1970

[21] Appl. No.: 53,441

Related U.S. Application Data

[63] Continuation-in-part of Ser. No. 846,393, July 9, 1969, abandoned.

[52] U.S. Cl. .......... 340/172.5
[51] Int. Cl. .......... H04j 3/12, G06f 13/00
[58] Field of Search .......... 340/172.5

[56] References Cited

UNITED STATES PATENTS 3,407,387 10/1968 Looschen et al. ....340/172.5 X
3,411,139 11/1968 Lynch et al. ..........340/172.5
3,432,813 3/1969 Annunziata et al. .....340/172.5
3,253,262 5/1966 Wilennitz et al. ........340/172.5
3,496,551 2/1970 Driscoll et al. .........340/172.5
3,408,632 10/1968 Hauck ..........340/172.5
3,283,306 11/1966 Patrusky ..........340/172.5
3,478,321 11/1969 Cooper et al. ..........340/172.5

*Primary Examiner*—Harvey E. Springborn
*Attorney*—Christie, Parker & Hale

[57] ABSTRACT

There is described a computer system in which one or more processors can interrogate, on command, the input/output system to determine whether communication paths are available to the respective peripheral units. The input/output system has one or more multiplexors which service a number of input/output channels, each channel having a peripheral control unit that controls one or more peripheral devices. Some peripheral devices are operated by more than one peripheral control unit and associated channel through a switching exchange. The input/output system, in response to an interrogation command executed by any of the processors and identifying a selected peripheral device, returns information to the processor indicating whether or not a communication path is available to the designated peripheral device and, if more than one channel is available, which multiplexor has a channel available to that device. The processor then can initiate an input/output operation between the particular unit and memory.

5 Claims, 6 Drawing Figures

INVENTORS
WILLIAM CHANDLER PRICE
EDWIN A. HAUCK
JACOB F. VIGIL

BY Christie Parker & Hale
ATTORNEYS

APPARATUS FOR INTERROGATING THE AVAILABILITY OF A COMMUNICATION PATH TO A PERIPHERAL DEVICE

RELATED CASES

This is a continuation-in-part application of Ser. No. 840,393 filed July 9, 1969, now abandoned, and assigned to the same assignee as the present invention.

FIELD OF THE INVENTION

This invention relates to digital computer systems and, more particularly, is concerned with apparatus by which one or more processors can interrogate the input/output system to determine if a designated unit is available for initiating an input/output operation.

BACKGROUND OF THE INVENTION

To increase the flexibility and to improve the efficiency of digital computers, computer systems have been developed which are modular in configuration and which are capable of processing a number of programs concurrently. The modular design permits the capacity of various portions of the system to be expanded or modified to suit the requirements of each individual user. Thus, a computer system may be arranged with one or more processors, one or more memory modules, and one or more peripheral storage units, sometimes referred to as input/output units. Operation of the computer system is managed under the control of the operating system software, sometimes referred to as the Master Control Program or MCP. The use of an operating system or control program to control many of the "housekeeping" functions within a complex computer system is common to the computer art. See "Basics of Digital Computers" Revised Second Edition Vol 3, by John J. Murphy, Hayden Book Company, page 121. One of the functions of the Master Control Program is the management of the input/output units and the associated peripheral control hardware. For example, the Master Control Program must allocate the resources of the input/output system, as needed, to particular programs. Allocation of peripheral units by the Master Control Program requires that the Master Control Program include information as to the types of units available, whether the control hardware provides a communication path from a particular processor to a particular type of unit, and whether the unit is ready to use, i.e., whether the power is turned on, the unit is loaded with tape, cards, or whatever, and the unit is on-line. In such a system, the objective is to obtain maximum utilization of the computer system, including all of the input/output equipment, by operation of the Master Control Program, while at the same time, minimizing the time and equipment devoted to this overhead function.

In the past, such systems have been arranged so that a designated peripheral unit is always the same. The types of equipment available to the system and their designations are then known at all times, and therefore, the allocation by the MCP of peripheral units to the system is merely a question of availability. Such a system lacks flexibility since the configuration of input/output equipment can only be changed by extensive design and manufacturing changes.

Availability depends on there being paths which can be utilized. In some prior art systems, a number of different peripheral control units are provided, each of which can provide a path to any peripheral unit. This requires the control unit to be rather complex and expensive. In other systems, there are different control units for each type of peripheral unit, but each control unit can service a number of the same type of peripheral units through an exchange. Moreover, several identical control units may service a pool of peripheral units. Such prior art arrangements, however, require each control unit to have its own data transfer channel and no means is provided for the processor to derive configuration information on command from the input/output system.

SUMMARY OF THE INVENTION

In U.S. Pat. No. 3,408,632, there is described an input/output system utilizing a multiplexor by which data can be transferred between memory and a number of input/output control units on a time-sharing basis. The present invention provides an improvement in such a system in which information as to the available communication paths to those units is at all times directly and efficiently accessible on command by the Master Control Program in the processor.

The basic computer system includes one or more processors, an addressable main memory, one or more multiplexors, and a plurality of peripheral control units, each designed to operate with one or more of one type of peripheral input/output unit. The apparatus of the present invention includes a gating logic circuit in each of the multiplexors, each gating circuit having a plurality of outputs corresponding in number to the number of control units connected to the associated multiplexor. The gating circuit, in response to a coded signal from the processor identifying a particular peripheral unit, activates one or more of said outputs from the gating circuit according to which control units service the identified peripheral unit. The outputs of the gating circuit in each multiplexor are connected by an information bus back to the processor. Each of the control units provides an output signal to all the multiplexors for indicating when the control unit is not busy and is available to the system. A circuit in each of the multiplexors, in response to a command from any of the processors identifying a particular peripheral unit, compares the outputs of the gating circuit with the corresponding output of each of the control units. The resulting output from the comparing circuits indicates that one or more communication paths are available to the particular peripheral unit. The output is coupled to the processors by the same information bus.

DESCRIPTION OF THE DRAWINGS

For a more complete understanding of the invention, reference should be made to the accompanying drawings wherein.

DETAILED DESCRIPTION OF THE INVENTION

Figure 1:
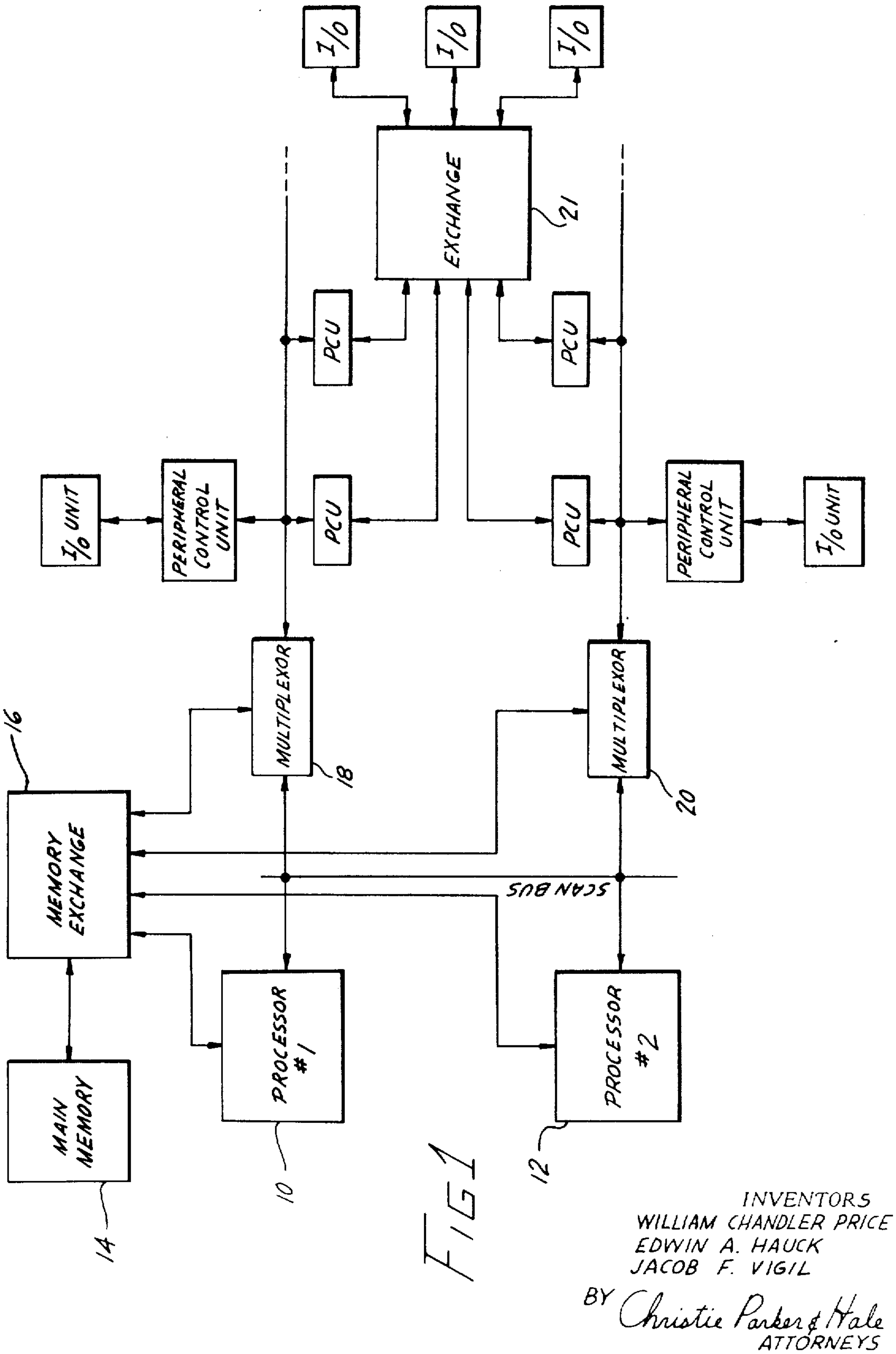
FIG. 1 is a block diagram of a computer system incorporating the features of the present invention.

Referring to FIG. 1, there is shown a computer system comprising one or more processors, two of which are indicated at 10 and 12. Each of the processors communicates with a main memory 14 through a memory exchange 16. The main memory 14, in turn, is arranged to receive data from and/or transmit data to a number of data storing peripheral units, such as magnetic tape storage units, card readers, magnetic disc files, printers, paper tape units and the like, designated I/O units in FIG. 1. Communication with the main memory 14 and the plurality of I/O units is through the memory exchange 16 and one or more multiplexors 18 and 20. The multiplexors 18 and 20 are preferably of the type described in U.S. Pat. No. 3,408,632.

Each multiplexor has the capability of communicating with a number of peripheral control units, designated PCU in FIG. 1. Each peripheral control unit is designed to control a particular type of I/O unit. However, any one of a group of identical peripheral control units can be connected with any one of a group of identical I/O units through a switching exchange 21. It will be noted that the exchange 21 may provide connections to peripheral control units associated with two different multiplexors. The use of an exchange in this manner is described in the above-referenced book "-Basics of Digital Computers", Vol. 3, pages 100–102. By the way of example, in one embodiment of the invention an input/output system involving two multiplexors may incorporate as many as 256 separate I/O units, with each multiplexor being connected to as many as 20 peripheral control units. However, the number of time-shared data communication channels through each of the multiplexors may be limited to 12 or less.

The allocation of the resources of the input/output system to particular programs or to any one of the processors in any conventional multi-processing computer system is under the control of the operating system program, commonly known as the Master Control Program, which is available to either processor from the main memory 14. In order to be able to allocate properly such a large number of peripheral units by the Master Control Program, it is desirable that the Master Control Program be able to interrogate the input/output system on demand. Interrogation by the Master Control Program to determine available input/output communication paths is initiated by an instruction, called on Interrogate Path instruction, inserted in the Master Control Program and executed by either processor using a scan bus which is connected to both multiplexors.

Figure 2A:
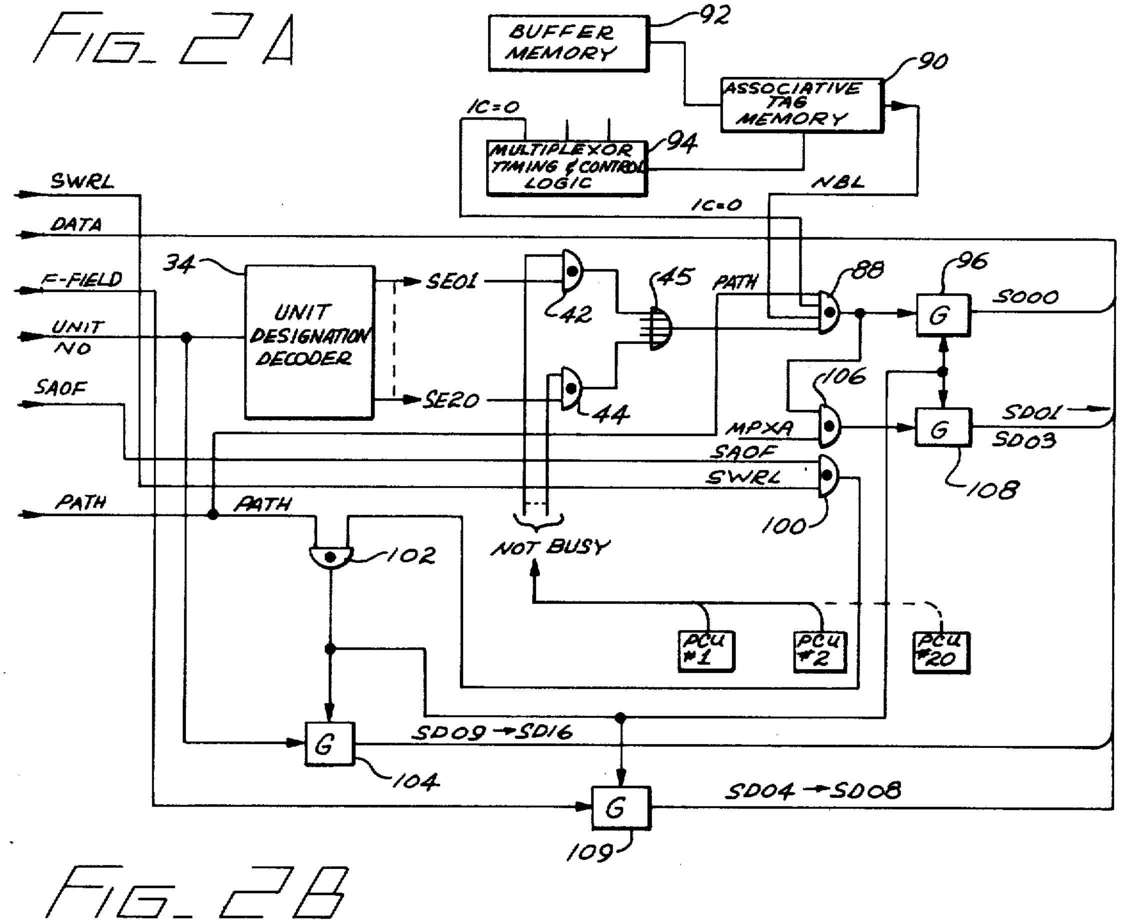
FIGS. 2, 2A, and 2B provide a detailed schematic block diagram of the preferred embodiment of the invention.
Figure 2B:
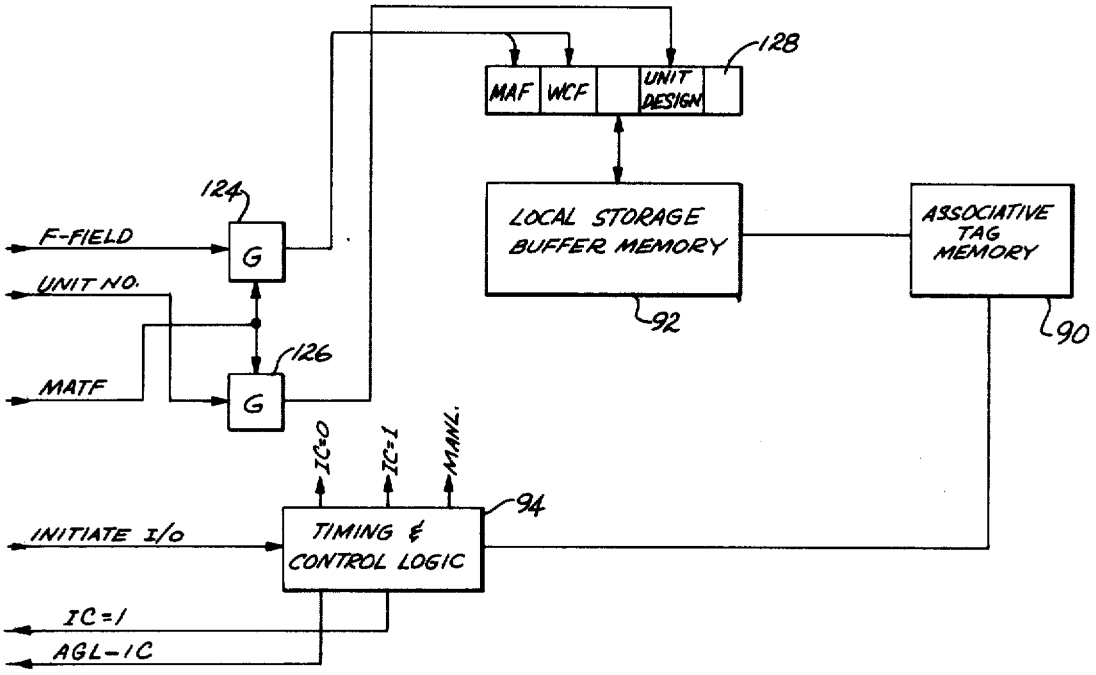
Figures 2, 3, 4:
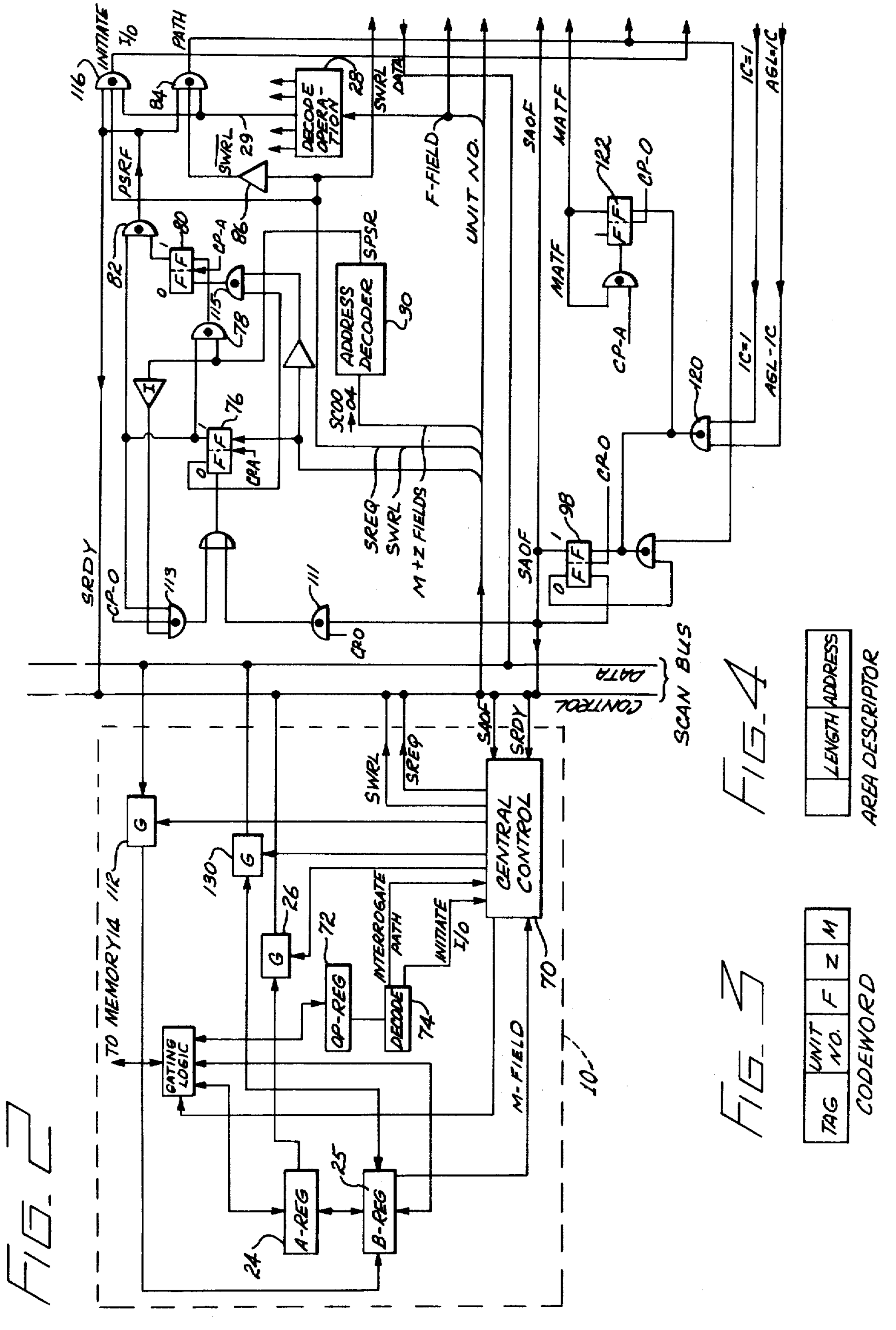
FIGS. 3 and 4 show formats of words used in the processor in connection with the operations described.

Referring to FIGS. 2, 2A, and 2B there is shown in more detail the circuit by which each of the processors may interrogate the availability of communication paths through the respective multiplexors to any designated peripheral unit and by which any one of the processors can initiate an I/O operation between main memory and any designated one of the peripheral units. The processor 10, which is preferably of a type described in more detail in U.S. Pat. No. 3,200,379 in which instructions are in the form of operators without addresses and separate value call instructions which are used to transfer data or other information from main storage into a stack. However, the invention is not limited to processors of this type but may be used with any conventional processor having single or multiple address instructions. The processor 10, includes a central control unit 70 which fetches instructions, whether they be operators or value calls, from the main memory to an OP register 72 which corresponds to the program register in the above U.S. Pat. No. 3,200,379. The command portion of the instruction is decoded by a decoding circuit 74 which recognizes when an Interrogate Path instruction is present in the register 72. The decoding circuit 74 activates an output line, designated Interrogate Path, which is applied to the central control unit 70. The central control unit 70, in response to the Interrogate Path condition, activates certain gating controls in sequence to carry out the execution of the instruction in the manner hereinafter described. Prior to executing the Interrogate Path operation, the processor, by appropriate programming, loads an A-register 24 with an Interrogate I/O Path code word from memory. The A-register 24 and a B-register 25 form the top two positions of a "stack" memory in the manner described in the above-identified patent. The Interrogate Path code word, as shown in FIG. 3, includes an M field which may be set to indicate whether all multiplexors are to respond or only the multiplexor identified by the Z field. The F field is coded to indicate the type of operation the multiplexors are to perform, for example, the operation may require the multiplexors to interrogate the availability of a path to a designated peripheral unit, and/or to initiate an input/output operation between a designated unit and memory. The code word further includes a unit number field designating a particular peripheral device. A tag field merely identifies the code word as being a code word rather than an operand instruction or other type of word.

In response to an Interrogate Path instruction in the OP register 72, the central control 70 gates the code word in the A-register 24 by means of a gate 26 to the control lines of the scan bus. The central control unit 70 at the same time applies a Scan Request level, SREQ, to a control line of the scan bus, signaling that the processor is making a scan request to the various multiplexors and other devices connected to the scan line. The central control unit 70, also in response to the Interrogate Path instruction in the OP register 72, sets a Scan Write level, SWRL, to zero, indicating that the processor is executing a scan Read operation rather than a scan Write operation, i.e., that the processor is executing an instruction which requires information to be read out of the device being scanned into the processor.

The control lines of the scan bus are applied to each of the multiplexors as well as any other equipment connected to the scan bus. Each multiplexor includes a control flip-flop 76 which is turned on by the presence of the Scan Request level on the scan bus. The turning on of the control flip-flop 76 is synchronized with a local clock pulse CP-A. At the same time, and M and Z fields of the code word applied to the scan bus from the A-register 24 are applied to an address decoder 30 in each of the multiplexors. The address decoder turns on an output level SPSR if the M and Z fields indicate either that all multiplexors are to respond to the scan request, or if the address of the Z field corresponds to that of the particular multiplexor.

The SPSR level, together with the "ON" level from the control flip-flop 76 are applied to an AND circuit 78, the output of which turns on a second control flip-flop 80 in response to the next clock pulse CP-A. An AND circuit 82 senses when both the control flip-flops 76 and 80 are on, the AND circuit 82 providing an output level PSRF. This level is returned to the processor over a control line of the scan bus as a Scan Ready Signal SRDY. This level is applied to the central control unit 70 to indicate that the Scan Request has been recognized by the appropriate multiplexor.

At the same time the F field applied to the scan bus from the A-register 24 is connected to an operation decorder 28 which activates one of a plurality of outputs depending upon the type of operation designated by the F field. For the Interrogate Path operation, an output line 29 is activated which is applied to a logical AND circuit 84 together with the PSRF level from the AND circuit 82 and the inverted SWRL level from the scan bus, derived from an inverter 86. The output of the logical AND circuit 84 is true if the processor by means of the code word in the A-register 24 has designated an Interrogate Path operation.

The unit designation lines from the scan bus are applied to a unit designation decoder 34 (See FIG. 2A). The decoder 34 activates one or more of a plurality of output lines, the number of lines corresponding to the number of peripheral control units which can be connected to the multiplexor. The decoder 34 is preferably in the form of a printed circuit card which can easily be replaced in the field if it is desired to change the types of I/O units connected to the system. Since, as pointed out above in connection with FIG. 1, a group of identical I/O units can be connected through an exchange to more than one peripheral control unit, the designation number of a particular I/O unit in the group of identical units may result in more than one output of the decoder 34 being energized. 20 such output lines, designated SE01 through SE20 are shown by way of example.

Each of the output lines from the decoder 34 is connected to an associated one of a group of logical AND circuits corresponding in number to the number of output lines from the decoder, two of the AND circuits being indicated at 42 and 44. Also connected to each of the logical AND circuits 42 and 44 is a control line from a corresponding one of the peripheral control units. Each of these lines provides an "ON" level if the peripheral control unit is not busy and an "OFF" level if the control unit is busy. The specific manner in which the peripheral control units energize the Not Busy line is described in more detail in the above-identified U.S. Pat. No. 3,408,632.

The output of each of the AND circuits, including AND circuits 42 and 44, are connected through an OR circuit 45 to an AND circuit 88. The output of the OR circuit 45 will be true if any of the peripheral control units associated with the designated I/O unit are not busy.

As pointed out in the above-identified patent, each multiplexor includes an associative tag memory 90 for addressing a buffer memory 92. The buffer memory contains control words for each active channel to a peripheral control unit. The buffer memory 92, by means of the associative tag memory 90, permits the number of control words in the buffer memory to be limited to a number considerably less than the total number of peripheral control units connected to the multiplexor. The associative tag memory permits a particular location in the buffer memory to be assigned to a particular channel at the time the channel is activated to establish data transfer between a particular peripheral control unit in memory. If all the available word locations in the buffer memory 92 are being used, the associative tag memory can accommodate no additional addresses. The associative tag memory 90 has an output line designated NBL which provides a level which is "true" if the associative tag memory has addresses for less than all the available word locations in the buffer memory 92. If all the addresses in the tag memory have been assigned, the NBL level is not true. The NBL level is applied to the AND circuit 88 so that the output of the AND circuit 88 can only be true if the peripheral control unit connected to the designated I/O unit is not busy and there is an available control word storage location in the buffer memory 92.

Also connected to the AND circuit 88 is a control line designated IC=O from the multiplexor timing and control logic 94. As described in the above-identified patent, the multiplexor timing and control logic includes a control counter which is used to sequence the multiplexor through a series of operations necessary to initiate an input/output operation. When this counter is in the IC=O state, the multiplexor is not in the process of initiating a new input/output operation. The output from the AND circuit 84, indicating that an Interrogate Path operation is being executed, is also applied to the AND circuit 88. Thus the output of the AND circuit 88 is true if a peripheral control unit which services the designated I/O unit is not busy, if the associative tag memory is not full, and if the multiplexor is not in the process of executing an Initiate I/O operation.

The output of the AND circuit 88 is gated by means of a gate 96 to one of the data lines of the scan bus, designated SD00. The gate 96 is controlled by a third control flip-flop 98, (see FIG. 2). This flip-flop is controlled by a clock pulse CP-0 which occurs at one-third the rate of the clock pulse CP-A. When the output of the AND circuit 84 goes true, the control flip-flop 98 is set to 1 by the next CP-0 clock pulse. The output of the control flip-flop 98, designated SAOF, indicates that scan access has been obtained.

The SAOF level is applied to an AND circuit 100 together with the SWRL level received from the processor over the scan bus. See FIG. 2A. The output of the AND circuit 100 is applied to an AND circuit 102, together with the output of the AND circuit 84. The output of the AND circuit 102 is applied to the gate 96 and is also applied to a gate 104 which gates the unit designation lines from the control portion of the scan bus to the data portion of the scan bus over data lines SD09 through SD16. This information is returned to the processor over the scan bus to indicate to the processor whether or not a peripheral control unit is available for establishing communication between the designated peripheral unit and memory through one of the multiplexors.

In order to provide an indication to the processor as to which multiplexor is available, the output of the AND circuit 88 is applied to an AND circuit 106 together with a signal MPX indicating the particular multiplexor is active. The output of the AND circuit 106 is applied to a gate 108, the output of which is connected to particular ones of the three data lines SD01, SD02, and SD03. Thus each multiplexor which has a path available to the designated unit provides a special coded signal on the three data lines back to the processor providing an identification of the specific multiplexor unit.

The output SAOF of the third control flip-flop 98 is also applied by a control line of the scan bus to the central control 70 of the processor. In response to the Interrogate Path signal from the decoder 74 and the SAOF level being set to 1 by the flip-flop 98, the central control unit 70 operates a gate 112, gating the data lines of the scan bus to the B-register 25. Thus a control word is formed in the B-register having an M field set from the output of gate 96 of a responding multiplexor which indicates that an input/output path is available to a particular peripheral unit through one of the multiplexors. A Z field is set from the output of gate 108 which identifies which of the multiplexors has an available path. The unit designation number is set from the gate 104 as part of the control word in the B-register 25. Also the F field is set by the gate 109 to the same value as the F field in the code word of the A-register 24.

The SAOF level is applied to an AND circuit 111 together with a CP-0 clock pulse to reset the control flip-flop 76. This flip-flop is also reset by an AND circuit 113 if the SPSR level is not set by the decoder 30 in response to the Z field, so that a multiplexor that is not addressed during a scan request operation is returned to its stand-by condition. When the control flip-flop 76 is reset, the control flip-flop 80 is reset by the next CP-A clock pulse by the output of an AND circuit 115 that also senses that the SREQ level is off. The control flip-flop 98 is reset by the SAOF level with the next CP-0 clock pulse.

If the M field of the control word stored in the B-register 25 by the Interrogate Path instruction is a 0, indicating that no path is available to the designated unit, the operation is complete. If, on the other hand, the M field is 1, indicating that a path is available, the processor then executes an Initiate I/0 operation. This may be done either programmatically by means of fetching the next instruction, which calls for an Initiate I/0 operation, into the OP register 72 or by action of the central control 70 in response to the status of the M-field in the control word in the B-register 25 indicating an affirmative response of the Interrogate Path operation.

In either case, the stack is adjusted by the central control 70 by transferring the word stored in the B-register 25 by the Interrogate Path operation to the A-register 24 and transferring a memory area descriptor into the B-register 25 from main memory 14 in a manner described in detail in U.S. Pat. No. 3,200,379. The area descriptor includes an address and length of a buffer area in memory in which data is to be transferred to or from the designated peripheral unit (See FIG. 4). For the Initiate I/0 operation, it will be seen that the code word in the A-register 24 is similar to the code word provided at the start of the Interrogate Path operation. The unit designation number is the same, the F field is the same, while the M and Z fields point to the multiplexor which has a path available to the designated unit.

In the Initiate I/0 operation the central control 70 turns off the SWRL level applied to the control line of the scan bus. At the same time, the contents of the A-register 24 are applied by the gate 26 to the other control lines of the scan bus together with the scan request signal on the SREQ line. As in the Interrogate Path operation, each multiplexor, in response to the levels on the control lines of the scan bus, turns on the first control flip-flop 76 and, in the addressed multiplexor, turns on the second control flip-flop 80. An AND circuit 116 senses that the output of the AND circuit 82 is true, that the SWRL level is true, and that the F field is the same as for Interrogate Path. This provides an Initiate I/0 level at the output of the AND circuit 116.

This Initiate level is applied to the timing and control logic 94 (see FIG. 2B) in the multiplexor in the manner described in detail in the above-identified patent. The Initiate level causes a control counter to count from the I C=0 to the IC=1 state as the first operation in executing an Initiate I/0 operation. The IC=1 state from the timing and control logic circuit 94 of the multiplexor is applied to a logical AND circuit 120 together with the line AGL-IC, which line is derived from a priority circuit in the manner in detail in the above-identified patent. The AGL-IC is true if priority has been granted to the Initiate I/0 control operation.

The output of the AND circuit 120 turns on the control flip-flop 98, providing the SAOF control signal on the scan bus to the processor to indicate that scan access has been obtained. At the same time, the output of the AND circuit 120 turns on a control flip-flop 122 which remains on until the next fast clock pulse CP-A turns it back off.

The output level MATF from the control flip-flop 122 is applied to a pair of gates 124 and 126 (see FIG. 2B). The gate 124 couples the data lines of the scan bus to the local storage buffer register 128 of the multiplexor. As described in the above-identified U.S. Pat. No. 3,408,632, the register 128 is the information register for the buffer memory and includes a memory address field MAF and a word counter field WCF. When the SAOF level is received from the multiplexor by the processor 10, central control 70 opens a gate 130 which gates the contents of the B-register 25 to the data lines of the scan bus. The portion of the area descriptor word in the B-register which contains the base address of the location in memory to be used in the I/0 operation being initiated is transferred from the B-register 25 over the data lines of the scan bus to the MAF field of the local storage buffer register 128. The length field in the area descriptor word in the B-register 25 is at the same time transferred to the WCF field of the register 128. The gate 126 connects the unit number control lines of the scan bus to the unit designation field of the register 128 from the A-register 24 of the processor.

Using the base address in the WAF field of the register 128, the multiplexor obtains an I/0 descriptor from memory which is stored as part of the control word in the register 128. The multiplexor is then conditioned to perform an I/0 operation between the designated peripheral unit and the specified area in memory in the manner taught in detail in the above-identified patent. The processor, in response to the SAOF signal on the control line from the multiplexor through the central control 70, completes the Initiate I/0 operation and continues with the normal execution of the next operation in the program string.

What is claimed is:

1. A computer system comprising memory means, a processor including an instruction register, data register means, and control means responsive to the contents of the instruction register for controlling the processor to execute each instruction in the instruction register, a plurality of peripheral units of different types adapted to send or receive data, each peripheral unit having a uniquely coded unit designation identifying the peripheral unit, a plurality of control units, each control unit controlling operation of at least one peripheral unit, means connecting each peripheral unit to at least one control unit, at least one multiplexing unit adapted to transfer data between selected ones of the control units and the memory means over a plurality of multiplexed data transfer channels, each control unit including means generating a Not Busy signal indicating when the control unit is not in use, means activated by said control means in the processor in response to a particular instruction in the instruction register of the processor for transferring a control word from the data register means in the processor to the multiplexing unit, the control word identifying a peripheral unit by its coded unit designation, decoding means in the multiplexing unit responsive to the unit designation provided by the control word received from the data register means for generating output signals identifying which if any of the control units associated with the multiplexing unit is connected to and controls the designated peripheral unit, means responsive to the output signals from the decoding means and the not busy signals from the control units for generating a binary coded output control signal that indicates if any of the control units identified by the output signals of the decoding means is not in use, and means in the multiplexing unit for transferring said output control signal to the data register means in the processor for storing the status of said output control signal in the processor.

2. Apparatus as defined in claim 1 further including means in the multiplexing unit responsive to said control word from the processor for transferring the peripheral unit designation portion of the coded word back to the data register means in the processor.

3. Apparatus for controlling transfer of data between a plurality of input/output units and main memory in a multiprocessor computer, comprising a plurality of processors, each processor including data register means, an instruction register, and control means responsive to the contents of the instruction register for controlling the processor in accordance with the contents of the instruction register, a plurality of peripheral control units for controlling associated input/output units, each control unit being connected to and arranged to control one or more predetermined input/output units, a plurality of multiplexing units controlling transfer of data between main memory and said plurality of control units, a scan bus interconnecting each of the processors and the multiplexing units, the control means in any one of the processors in response to a predetermined setting of the instruction register of the corresponding processor transferring a control word from said data register means by the scan bus to all of the multiplexing units, the control word having a number identifying a particular input/output unit, each of the multiplexing units including decoding means responsive to the input/output unit number of the control word on the scan bus, the decoding means providing an output identifying which if any peripheral control units associated with the multiplexing unit is connected to the particular input/output unit identified by the number in the control word, and signaling means coupled to the output of the decoding means for signaling the processor over the scan bus if the output of the decoding means indicates that any peripheral control unit is connected to the particular input/output unit identified by the number in the control word.

4. Apparatus as defined in claim 3 wherein each control unit includes means generating a signal indicating when the control unit is in a Not Busy state, said signaling means including means responsive to the Not Busy signals for enabling said signaling means only if one of the control units connected to the designated input/output unit is in a Not Busy state.

5. Apparatus as defined in claim 4 wherein each multiplexing unit further includes means providing a signal identifying the particular multiplexing unit, means responsive to said output signal which indicates if any of the control units is not busy for coupling the signal identifying the particular multiplexing unit back to the processors by the scan bus.

* * * * *

PO-1050
(5/69)

UNITED STATES PATENT OFFICE
CERTIFICATE OF CORRECTION

Patent No. 3,693,161 Dated September 19, 1972

Inventor(s) William C. Price, Erwin A. Hauck, and Jacob F. Vigil

It is certified that error appears in the above-identified patent and that said Letters Patent are hereby corrected as shown below:

Column 4, Line 60, after the comma, "and" should read --the--;

Column 7, Line 57, after the period insert --The adjustment of the stack by moving the contents of the B-register 25 into the A-register 24 and moving a word from the top of the stack memory area in main memory to the B-register 25 is described in detail in the above-identified patent 3,200,379.--

Signed and sealed this 20th day of November 1973.

(SEAL)
Attest:

EDWARD M.FLETCHER,JR.
Attesting Officer

RENE D. TEGTMEYER
Acting Commissioner of Patents